United States Patent
Huang et al.

(10) Patent No.: US 11,018,589 B1
(45) Date of Patent: May 25, 2021

(54) SYSTEMS, METHODS, AND APPARATUS FOR BALANCED CURRENT SHARING IN PARALLELED RESONANT CONVERTERS

(71) Applicants: Yu Ling Huang, Port Coquitlam (CA); Roumen Petkov, Burnaby (CA)

(72) Inventors: Yu Ling Huang, Port Coquitlam (CA); Roumen Petkov, Burnaby (CA)

(73) Assignee: SMPC TECHNOLOGIES LTD, Burnaby (CA)

(*) Notice: Subject to any disclaimer, the term of this patent is extended or adjusted under 35 U.S.C. 154(b) by 0 days.

(21) Appl. No.: 16/782,876

(22) Filed: Feb. 5, 2020

(51) Int. Cl.
*H02M 3/28* (2006.01)
*H02M 7/08* (2006.01)
*H02M 3/337* (2006.01)
*H02M 1/00* (2006.01)

(52) U.S. Cl.
CPC ......... *H02M 3/285* (2013.01); *H02M 3/3372* (2013.01); *H02M 7/08* (2013.01); *H02M 2001/0058* (2013.01)

(58) Field of Classification Search
CPC .......... H02M 3/22; H02M 3/28; H02M 3/285; H02M 3/3372; H02M 3/337; H02M 3/3376; H02M 7/08; H02M 3/33592; H02M 2001/0058
See application file for complete search history.

(56) References Cited

U.S. PATENT DOCUMENTS

| | | | | |
|---|---|---|---|---|
| 8,184,456 | B1* | 5/2012 | Jain ................... | H02M 5/29 363/21.02 |
| 9,236,808 | B1* | 1/2016 | Hung .................. | H02M 3/285 |
| 9,240,723 | B2* | 1/2016 | Boysen ............... | H02M 3/3376 |
| 10,491,123 | B2* | 11/2019 | Wang ................. | H02M 3/33576 |
| 2008/0190906 | A1* | 8/2008 | Aigner ................ | H02M 3/335 219/130.21 |
| 2009/0231887 | A1* | 9/2009 | Ye ...................... | H02M 3/33569 363/21.02 |
| 2012/0262953 | A1* | 10/2012 | Jungreis ............. | H02M 3/33569 363/17 |
| 2016/0254754 | A1* | 9/2016 | Perreault ............ | H02M 1/4241 363/21.03 |
| 2017/0008405 | A1* | 1/2017 | Bojarski ............. | H02J 7/00712 |
| 2019/0157978 | A1* | 5/2019 | Ni ..................... | H02M 3/33569 |
| 2020/0313443 | A1* | 10/2020 | ElMenshawy ....... | H02J 7/007 |
| 2020/0350827 | A1* | 11/2020 | Ahmed ............... | H02M 3/1584 |

* cited by examiner

*Primary Examiner* — Adolf D Berhane

(57) ABSTRACT

Methods and systems for balancing output currents of parallel connected resonant converters are disclosed. One such method includes matching switching frequencies for a pair of resonant converters. The method also includes carrying AC output currents of resonant tanks of each of the resonant converters through a current controlled voltage source that is coupled to each of the resonant converters of the pair of resonant converters at an AC side of each of the resonant converters of the pair of resonant converters. The method further includes inducing, for the pair of resonant converters, a voltage that is proportional to a difference in the AC currents carried through the current controlled voltage source by passing the AC currents through the current controlled voltage source. The induced voltage is oriented to oppose the greater of the AC currents and to increase the smaller of the AC currents.

26 Claims, 8 Drawing Sheets

SYSTEMS, METHODS, AND APPARATUS FOR BALANCED CURRENT SHARING IN PARALLELED RESONANT CONVERTERS

TECHNICAL FIELD

The present disclosure relates to resonant converters, and in particular, current sharing in parallel resonant converters.

BACKGROUND

Inductor-inductor-capacitor ("LLC") converters are widely used in various power supply and conversion applications. The combination of inductors and a capacitor establishes resonance at the switching frequency. The resulting sine wave allows for the switching transistors to switch at or near the zero-crossing points. The LLC resonant converter may turn on its primary switches at a zero-voltage condition ("ZVS") and its secondary switches at a zero-current condition ("ZCS"). Switching at the zero-crossing points results in reduced switching losses in the switching transistors and high-power conversion efficiency. For very high output power applications, individual LLC modules may be connected in parallel and their output currents should be equalized.

Using LLC converters allows for higher switching frequencies and thereby, smaller components such as transformers and filters. Heat dissipation from the switching transistors may be reduced resulting in smaller heat sinks.

There exists a continuing desire to advance and improve technology related to LLC resonant converters.

SUMMARY

According to one aspect, there is provided a system for reducing a difference in AC currents of parallel connected resonant converters. The system may include a DC output port for coupling to a load. The system may also include a first and a second resonant converter, each coupled to a DC input and both coupled in parallel to the DC output port. Each of the resonant converters may further include a switching network coupled to the DC input for generating a wave voltage, a resonant tank positioned between and coupled to the switching network and a bridge rectifier. The bridge rectifier may be coupled to the DC output and the resonant converters may have matching switching frequencies;

The system may also include a current controlled voltage source coupled to the first and the second resonant converters at a position between the switching networks and the rectifier bridges of each resonant converter. The current controlled voltage source may be for providing an induced voltage that is proportional in magnitude to a difference in a first AC current of the first resonant converter and a second AC current of the second resonant converter and may be oriented to oppose a larger AC current of the first and second AC currents and in the same direction as a smaller AC current of the first and second AC currents, thereby decreasing a difference in the first and second AC currents.

The resonant converters may be LLC resonant converters. In some embodiments, the resonant converters may be LCC resonant converters.

The current controlled voltage source may be a current balancing transformer that includes a first winding coupled in series to the first resonant converter for carrying the first AC current from the first resonant converter and a second winding coupled in series to the second resonant converter for carrying the second AC current from the second resonant converter. The system may be configured such that a first magnetomotive force generated by the first AC current flowing through the first winding may be oriented opposite to a second magnetomotive force generated by the second AC current flowing through the second winding and the resultant aggregate magnetomotive force may induce a voltage that opposes the greater of the first and second AC currents.

The switching network may be operable with a switching sequence for generating a 180-degree phase shift in switching sequences of the first and second resonant converters, thereby configuring the system such that the first magnetomotive force is oriented opposite to the second magnetomotive force.

The first winding and the second winding may be mutually reversely coupled to their respective resonant converters for having mutually opposite current flow through the first and second windings and generating magnetomotive forces that are oriented in mutually opposite directions.

The resonant tank and rectifier bridge of each resonant converter may be coupled by a transformer having a primary winding coupled to the resonant tank for carrying current from the resonant tank and having a secondary winding coupled to the bridge rectifier for carrying current to the bridge rectifier.

The current controlled voltage source may be positioned between the resonant tank and the transformer of each resonant converter.

The current controlled voltage source may be positioned between the bridge rectifier and the transformer of each resonant converter.

The bridge rectifiers may be full bridge rectifiers. In some embodiments, the bridge rectifiers may be half bridge rectifiers.

The bridge rectifiers may also be center tap rectifiers. The first winding of the balancing transformer may include a pair of windings each coupled to a portion of the transformer secondary winding of the first resonant converter for carrying current between the pair of windings and the first resonant converter transformer secondary winding. The second winding of the balancing transformer may include a pair of windings, each coupled to a portion of the transformer secondary winding of the second resonant converter for carrying current between each of the pair of windings of the second winding and the second resonant converter transformer secondary winding.

The wave voltage may be a square wave voltage.

The system may also include at least one additional resonant converter coupled to a DC input and connected in parallel with the first and second resonant converters to the DC output port. The at least one additional resonant converter may include a switching network coupled to the DC input for generating a wave voltage, a resonant tank positioned between and coupled to the switching network and a bridge rectifier with the bridge rectifier coupled to the DC output. An additional current controlled voltage source may be included for each of the at least one additional resonant converters, with each additional current controlled voltage source coupled to each of two mutually adjacent resonant converters at a position between the switching networks and the rectifier bridges of each resonant converter such that neighbouring current controlled voltage sources are coupled for carrying current between them. The DC input may be common or individual for each of the resonant converters.

According to another aspect, there is provided a resonant converter system. The resonant converter system may include a plurality of resonant converters connected in parallel to a DC output. Each resonant converter may include a switching network coupleable to a DC power source for generating a wave voltage, a resonant tank positioned between and coupled to the switching network and a bridge rectifier. The resonant converter system may also include a plurality of current controlled voltage sources, with the total number of current controlled voltage sources being at least one less than the total number of the plurality of resonant converters, with each one of the plurality of controlled voltage sources coupled to each of two mutually adjacent resonant converters at a position between the switching networks and the rectifier bridges of each resonant converter such that neighbouring current controlled voltage sources are coupled for carrying current between them. Each of the current controlled voltage sources may be for providing an induced voltage that may be proportional in magnitude to a difference in AC currents of the resonant tanks the current controlled voltage source is coupled to and that is oriented to oppose a larger of the AC currents and in the same direction as a smaller of the AC currents, thereby decreasing a difference in output currents of the resonant converters.

According to another aspect, there is provided a method for balanced current sharing between resonant converters connected in parallel to a DC output. The method may include matching switching frequencies for a pair of resonant converters and carrying a first AC current of a first resonant tank of a first resonant converter of the pair of resonant converters and a second AC current of a second resonant tank of a second resonant converter of the pair of resonant converters through a current controlled voltage source that is coupled to each of the first and second resonant converters at an AC side of each of the first and second resonant converters. The method may also include inducing, for the pair of resonant converters, a voltage that is proportional to a difference in the first and second AC currents carried through the current controlled voltage source by passing the first and second AC currents through the current controlled voltage source. The induced voltage may be oriented to oppose the greater of the first and second AC currents and to increase the smaller of the first and second AC currents.

The current controlled voltage source may be a current balancing transformer and inducing the voltage may include generating a first magnetomotive force by passing the first AC current through a first winding of the balancing transformer. It may also include generating a second magnetomotive force opposing the first magnetomotive force by passing the second AC current through a second winding of the balancing transformer, where the first and second AC currents may flow through the first and second windings in mutually opposite directions. It may also include inducing the voltage by having the first and second AC currents flow through the first and second windings respectively in the presence of an aggregate magnetomotive force resulting from the difference between the first and second magnetomotive forces.

The method may also include introducing a 180-degree phase shift in switching sequences of the pair of resonant converters to have the first and second AC currents flow through the first and second windings respectively in mutually opposite directions.

The first winding and the second winding may be mutually reversely coupled to their respective resonant converters.

BRIEF DESCRIPTION OF THE DRAWINGS

In the accompanying drawings, which illustrate one or more example embodiments.

DETAILED DESCRIPTION

Figure 1:
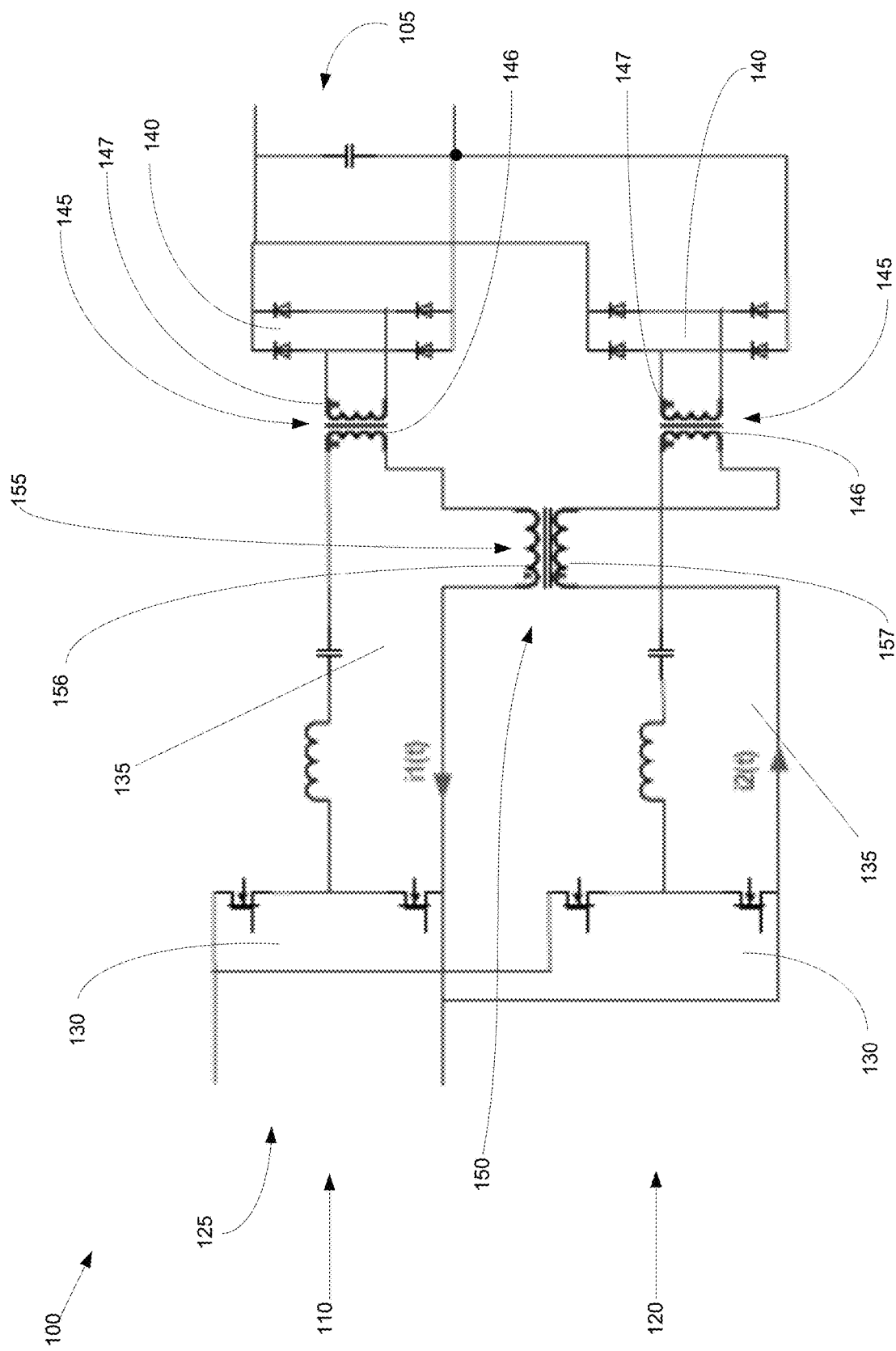
FIG. 1 is a circuit diagram of a system of parallel connected resonant converters coupled to a current controlled voltage source, according to one embodiment.

Directional terms such as "top", "bottom", "upper", "lower", "left", "right", and "vertical" are used in the following description for the purpose of providing relative reference only, and are not intended to suggest any limitations on how any article is to be positioned during use, or to be mounted in an assembly or relative to an environment. Additionally, the term "couple" and variants of it such as "coupled", "couples", "coupling", and "couplable" as used in this description are intended to include indirect and direct connections unless otherwise indicated. For example, if a first device is coupled to a second device, that coupling may be through a direct connection or through an indirect connection via other devices and connections. Similarly, if the first device is communicatively coupled to the second device, communication may be through a direct connection or through an indirect connection via other devices and connections. The term "couplable", as used in the present disclosure, means that a first device is capable of being coupled to the second device. A first device that is communicatively couplable to a second device has the ability to communicatively couple with the second device but may not always be communicatively coupled.

LLC converters are widely used in various power supply applications. A typical LLC resonant converter may include a resonant tank (inductor-capacitor resonant network). The resonant tank may be coupled on the input side to a switching network. The switching network may be coupled to a DC input. On the output side, the resonant tank may be coupled through a transformer to a bridge rectifier, a filter and an output load, with the primary winding of the transformer inserted into the resonant tank and the secondary winding of the transformer connected to the rectifier bridge. Multiple LLC resonant converters may be coupled in parallel to a DC output. Multiple LLC resonant converters may share a common DC input. In some embodiments, each of the multiple LLC resonant converters may have its own DC input.

The switching network may be, in typical applications, a bridge of four switches (Full Bridge Topology) or two switches (Half Bridge Topology). The switches may turn on and off alternately with a set switching frequency and generate a square wave voltage that may be applied onto the resonant tank. Following rectification by the rectifier bridge, an isolated DC voltage may be obtained. A DC gain of the LLC resonant converter is provided by a ratio of the DC output voltage and the DC input voltage. The DC gain may be regulated by varying a switching frequency in a control mode such as the Pulse Frequency Modulation (PFM). For example, increasing the switching frequency may reduce the DC gain, thus reducing the output voltage. Decreasing the switching frequency may increase the DC gain, thereby increasing the output voltage.

The manufacturing tolerances of resonant inductors and resonant capacitors results in tolerances in the AC impedance and the resulting DC gains of the individual LLC resonant converters. When these LLC resonant converters are connected in parallel, they may not share the load current equally. The modules with higher DC gain may deliver higher current, while the modules with lower DC gain may deliver lower current. Unequal current sharing may be undesirable because the higher current modules may be more stressed than the lower current modules and system reliability may suffer.

A common method known in the art to equalize the currents of parallel connected modules is to use a master controller with a feedback control loop. The master controller with the feedback control loop measures the current for each module and controls the switching frequency (i.e. the DC gain) of each module to equalize their output currents. A drawback of this method is that this method may use a complicated control system. Furthermore, voltage components having the various switching frequencies of the modules may appear at the load terminals. To improve performance, additional measures may be taken to suppress these voltage components, leading to further complexity in the design of the system.

Another technique found in the existing art to balance or equalize output currents includes using independently regulated dedicated input voltages for each LLC resonant converter. This technique may increase complexity and costs by using separate controllable voltages for each LLC resonant converter. Additionally, this technique may use an extra control loop to regulate the input voltages based on the imbalance in current sharing. Another drawback of this technique is that each of the parallel LLC resonant converters may have its own control circuitry, thereby further increasing the complexity and cost of the system.

Additional techniques known in the existing art for equalizing output currents use firmware. For example, the dead time between turning the power switches on and off, which is the time between the end of turning on the power switch and the beginning of turning off the power switch, may be regulated to control the resonant converter's DC gain and equalize current sharing at the load. In some cases, one of the power switches may be phase-shifted to regulate the effective duty cycle, thereby regulating the DC gain, and equalize current sharing. Disadvantages of regulating the effective duty cycle by phase-shifting the power switches may include increased dead time. Phase shifting may also cause a loss of the ZVS of the primary switches, which may result in high switching losses, reduced power efficiency or possibly even damage to the converter.

Another technique for balancing current sharing or equalizing output currents involves inserting a coupled inductor in the current path at the rectified, DC side of parallel connected LLC resonant converters. However, due to the coupled inductor being positioned at DC side, it is prone to saturation, resulting in reduced current sharing effectiveness. To increase current sharing effectiveness, the size of the magnetic core in the coupled inductor may be increased.

The existing art also provides for a technique in which resonant inductors of each parallel connected LLC resonant converter are magnetically coupled. This technique does not compensate for tolerances in the resonant capacitors, thereby resulting in current sharing that is not balanced well.

The present disclosure provides for balanced current sharing by having a current controlled voltage source that may be controlled by a difference in AC currents of each pair of LLC resonant networks. In some embodiments, the current controlled voltage source may be a current balancing transformer coupled to a primary or secondary AC side of the LLC resonant networks.

Using a current controlled voltage source at the primary or secondary AC side of the LLC resonant converters to provide for balanced current sharing may provide a number of advantages over the existing art. For example, parallel LLC resonant converters may use common input voltage sources rather than having separate and controllable voltage sources for each of the parallel connected LLC resonant converters. Using common input voltage sources may result in the use of simpler circuits and lowered costs.

Another advantage of using a current controlled voltage source may be precise current sharing among the parallel connected LLC resonant converters due to the regulation of DC gains of each LLC resonant converter and compensation for the manufacturing tolerances of both resonant inductors and resonant capacitors rather than only resonant inductors or resonant capacitors.

A further advantage may be derived by connecting a current balancing transformer to an AC side of the LLC resonant converter. The current balancing transformer may be inserted at a primary AC side in series with the resonant tank or at the secondary AC side of the LLC resonant converter before the output rectifier. By having an option of connecting the current balancing transformer to the primary AC side or the secondary AC side may allow the current balancing transformer to be connected to the side having a lower current, thereby allowing for a reduction in the size of the current balancing transformer over circuits in which the transformer is connected to the higher current side. The lower current side may be the primary side of down converters and the secondary side of up converters. Furthermore, since the current balancing transformer carries AC currents, it may not be prone to saturation. Therefore, the magnetic core size of the current balancing transformer may be reduced over circuits in which it carries DC currents.

Using a current controlled voltage source for balancing current sharing in LLC resonant converters may also be advantageous due to its ease of implementation and simplicity. Each pair of parallel connected LLC resonant converters may achieve a balanced current by sharing a single current balancing transformer. An unlimited number of LLC resonant converters may be added in parallel by adding a current balancing transformer between each adjacent pair of parallel connected LLC resonant converters. Furthermore, a large number of parallel connected LLC resonant converters may be controlled by a single control circuit. The control principle may not use any additional control loops, resulting in reduced costs and a simplified control loop design. Additionally, where the parallel connected LLC resonant converters are controlled by a common control circuit, they may behave as a single converter with inherent current sharing. The lack of extra control loops may lead to much better load current or input voltage step responses than found in the existing art.

In the present disclosure, the terms balancing and equalizing, when applied to currents, are used interchangeably. Balancing or equalizing currents, as used in the present disclosure, means reducing the difference in magnitude of the currents being balanced or equalized. In some embodiments, balancing currents may result in the difference in current magnitudes being reduced to about 5% or less. In certain embodiments, balancing currents may result in the difference in current magnitude begin reduced to about 1-2% or less.

Referring to FIG. 1, an embodiment of a system for reducing a difference in AC currents of parallel connected resonant converters is shown at 100. The system 100 may comprise a DC output port 105 for coupling to a load. The system 100 may also comprise a first 110 and a second 120 resonant converter, each coupled to a DC input 125 and both coupled in parallel to the DC output port 105. In some embodiments, each resonant converter 110, 120 may be coupled to its own dedicated DC input 125. In certain embodiments, the resonant converters 110, 120 may be coupled in parallel to a common DC input 125. Any suitable DC input and power supply may be used.

Each of the resonant converters 110, 120 may include a switching network 130 for generating a wave voltage, a resonant tank 135 and a bridge rectifier 140. The switching network 130 may be coupleable to a DC power source, such as the DC input 125. The bridge rectifier 140 may be coupled to the DC output port 105 and the resonant tank 135 may be positioned between and coupled to each of the switching network 130 and the bridge rectifier 140.

The switching network 130 of each of the resonant converters 110, 120 may produce an alternating current (AC) using any suitable wave voltage for the resonant converters 110, 120. In some embodiments, the switching networks 130 may produce square wave voltages. Furthermore, in certain embodiments, the switching networks 130 may use matching switching frequencies for each of the resonant converters 110, 120.

Any suitable switching networks 130 may be used. For example, in some embodiments, a full bridge switching network may be used. In certain embodiments, a half bridge switching network may be used.

Any suitable resonant tank 135 may be used. In some embodiments, the resonant tank 135 may be an Inductor Inductor Capacitor (LLC) resonant tank, making the system 100 an LLC resonant converter. However, the system 100 is not limited to being an LLC resonant converter. Other types of resonant tanks may be used, such as an Inductor Capacitor Capacitor (LCC) resonant tank.

The resonant tank 135 may be coupled to the bridge rectifier 140 using any suitable type of coupling. In some embodiments, as shown in FIG. 1, the resonant tank 135 may be coupled to the bridge rectifier 140 using a transformer 145. The primary winding 146 of the transformer 145 may be on the resonant tank 135 side for carrying current from the resonant tank 135 and the secondary winding 147 may be on the bridge rectifier 140 side for carrying current for the bridge rectifier 140.

The bridge rectifier 140 is for producing a DC output. The portion of each resonant converter 110, 120 between the switching network 130 and the bridge rectifier 140 is, for the purposes of the present disclosure, the AC side of each resonant converter 110, 120. The AC side may be split, for the purposes of the present disclosure, into the primary AC side, which comprises the resonant tank 135 and the primary winding 146 of the transformer 145 and the secondary AC side, which comprises the secondary winding 147 and the portion of each resonant converter 110, 120 up to the rectifier bridge 140. In the present disclosure, the AC current that is input to the rectifier bridge 140 is referred to as the AC current.

Any suitable bridge rectifier 140 may be used. In some embodiments, a full bridge rectifier may be used. In certain embodiments, a half bridge rectifier may be used. In other embodiments, a centre tap rectifier may be used.

Any suitable electrical components may be used as the components in the system 100. For example, where a resistor is used, any suitable resistor may be used made of any suitable material and manufactured using any suitable method. Similarly, any suitable electrical, and where used, magnetic, couplings may be used for the various couplings and connections in the system 100. For example, and without limitation, any suitable wires, traces and interconnects, made of any suitable materials, such as but not limited to, aluminum or copper, may be used.

Referring again to FIG. 1, the system 100 may also include a current controlled voltage source 150 coupled to each of the first and the second resonant converters 110, 120 at a position between the switching networks 130 and the rectifier bridges 140 of each resonant converter 110, 120. The current controlled voltage source 150 may be for providing an induced voltage that is proportional in magnitude to the difference in AC currents of the first and second resonant converters 110, 120 and is oriented to oppose a larger AC current and in the same direction as a smaller AC current, thereby decreasing a difference in magnitudes of the AC currents of the resonant converters 110, 120. Reducing a magnitude difference in the AC currents may reduce a difference in DC outputs or DC gains between the resonant converters 110, 120.

The role of the current controlled voltage source 150 may also be described as inducing for the pair of resonant converters 110, 120 a voltage that is proportional to a difference in AC currents of the pair of resonant converters 110, 120. The induced voltage may be oriented to oppose the current direction of the greater AC current of the pair of resonant converters 110, 120 and to support the current direction of the smaller AC current of the pair of resonant converters 110, 120. The AC current for each of the resonant converters 110, 120 is the current entering the bridge rectifier 140 for each resonant converter 110, 120.

Any suitable type of current controlled voltage source 150 may be used. In some embodiments, as shown in FIG. 1, the current controlled voltage source 150 may be a current balancing transformer 155 comprising a first winding 156 coupled in series to the first resonant converter 110 for carrying current from the first resonant converter 110 and a second winding 157 coupled in series to the second resonant converter 120 for carrying current from the second resonant converter 120. The system 110 may be configured such that a first magnetomotive force generated by a first current flowing through the first winding 156 is oriented opposite to a second magnetomotive force generated by a second current flowing through the second winding 157.

Any suitable technique or configuration may be used for orienting the magnetomotive forces caused by the flow of current through each of the first winding 156 and the second winding 157 in opposite directions. In some embodiments, such as the embodiments shown in FIG. 1, the switching network 130 may be operable with a switching sequence for generating a 180-degree phase shift in switching sequences of the first and second resonant converters 110, 120, thereby configuring the system 100 such that the first magnetomotive force is oriented opposite to the second magnetomotive force.

Figure 2:
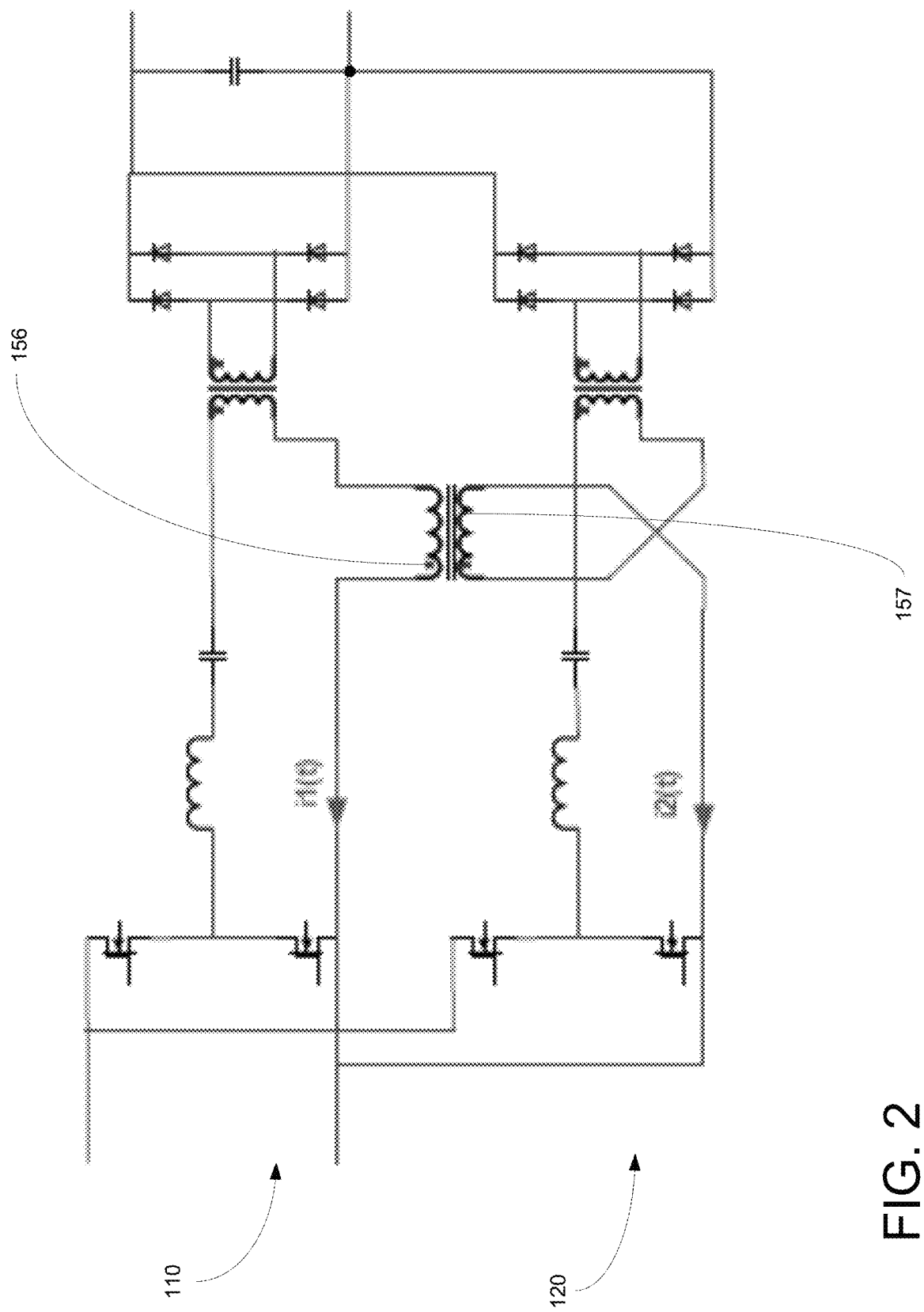
FIG. 2 is a circuit diagram of a system of parallel connected resonant converters coupled to a current controlled voltage source, according to one embodiment.

Referring to FIG. 2, in certain embodiments, the first winding 156 and the second winding 157, may be mutually reversely coupled to their respective resonant converters 110, 120. Being reversely coupled may result in mutually opposite current flow through the first and second windings 156, 157, thereby generating magnetomotive forces that are oriented in mutually opposite directions.

The resulting aggregate magnetomotive force of magnetomotive forces that are oriented in mutually opposite directions may induce a voltage that opposes the current direction of the greater of the first and second currents. The total magnetomotive force (H(t) in the magnetic core of the current balancing transformer 155 may be described as:

$$H(t) := \int_0^{le} (i_1(t) + i_2(t)) dl$$

where:
le: average length of the magnetic path.
i1(t), i2(t): resonant tank currents of the of the resonant converters.

Because the magnetomotive forces generated by the current flowing through the first and second windings 156, 157 of the current balancing transformer 155 are in reverse directions, the magnetomotive forces will cancel each other if the resonant currents producing them have the same magnitude. If the resonant currents are unequal, a generated voltage v(t) may be described as:

$$v(t) := u \cdot n \cdot Ac \cdot \left(\frac{d}{dt} H(t)\right)$$

where:
Ac is the cross-sectional area of the magnetic core of the current balancing transformer 155;
u is the permeability of the magnetic material of the magnetic core; and
n is the number of turns of the windings.

For a pair of resonant converters, such as the first and second resonant converters 110, 120 of the system 100 shown in FIG. 1 or FIG. 2, the induced voltage may be oriented such that it opposes the AC current of the resonant converter that delivers a larger output current, thereby reducing the DC gain and the output current of that resonant converter. For the resonant converter that delivers a lower output current, the induced voltage may be oriented such that it supports the AC current of that resonant converter, thereby increasing the DC gain and that resonant converter's output current. By causing a decrease in a larger AC current and an increase in a smaller AC current, the balancing transformer 155 may push the output currents of parallel connected resonant converters towards equalisation.

Figure 3:
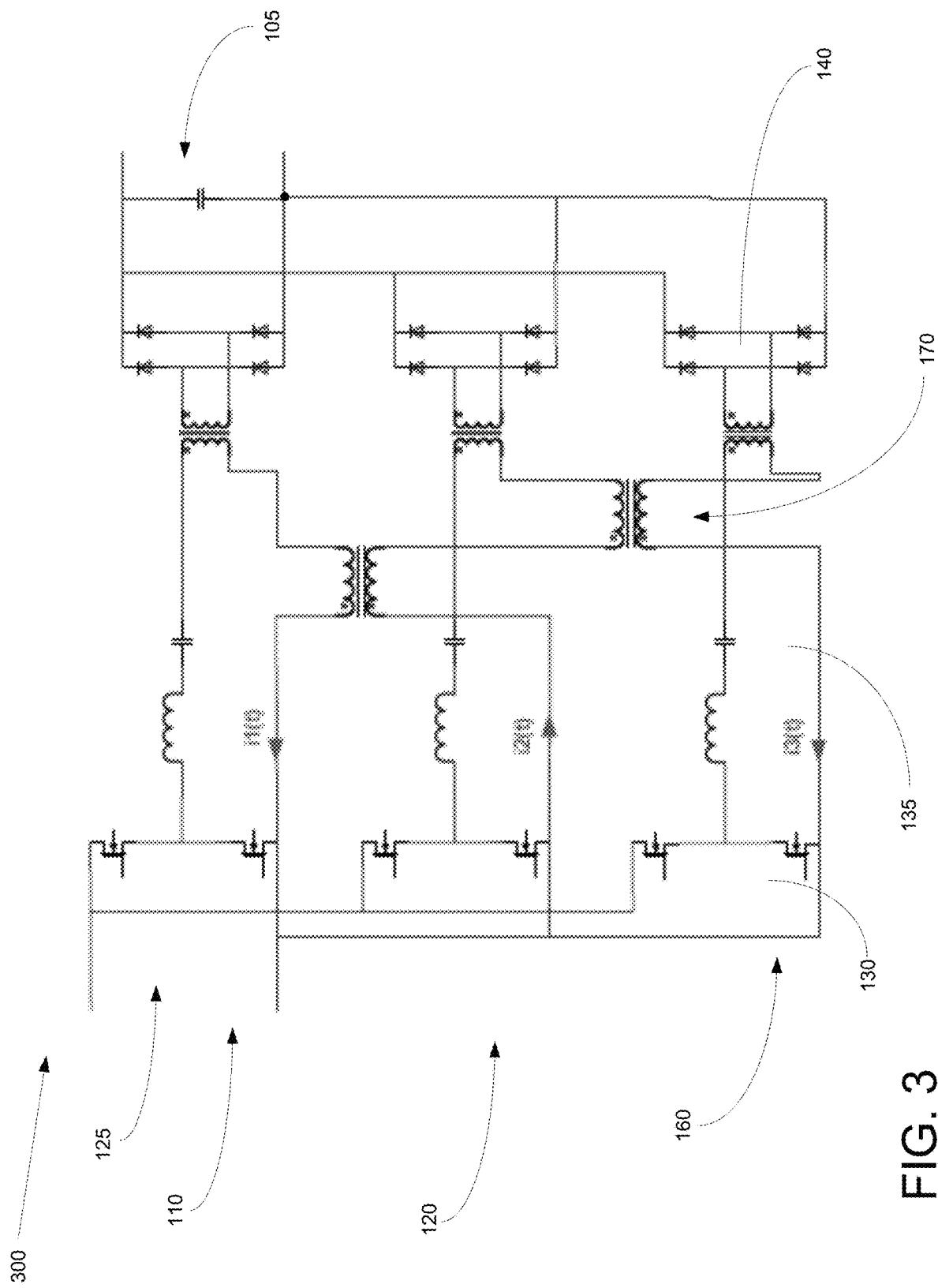
FIG. 3 is a circuit diagram showing more than two parallel connected resonant converters, according to one embodiment.

Referring to FIG. 3, additional balancing transformers 170 may be used to balance the output currents of additional parallel connected resonant converters 160. In some embodiments, any number of resonant converters may be connected in parallel and their output currents equalized (balanced) through the use of balancing transformers. For a total of N resonant converters connected in parallel, at least N−1 balancing transformers may be used to balance the output currents. The total number of current controlled voltage sources may be one less than the total number of resonant converters. Each of the controlled voltage sources may be coupled to each of two mutually adjacent resonant converters at a position between the switching networks and the rectifier bridges of each resonant converter such that neighbouring current controlled voltage sources are coupled for carrying current between them. wherein each of the current controlled voltage sources is for providing an induced voltage that is proportional in magnitude to the difference in output currents of the resonant converters it is coupled to and that is oriented to oppose the AC current of the resonant converter with the larger output current and in the same direction of the AC current of the resonant converter with a smaller output current, thereby decreasing a difference in output currents of the resonant converters Referring again to FIG. 3, in some embodiments, at least one additional resonant converter 160 may be coupled to a DC input and connected in parallel with the first and second resonant converters 110, 120 to the DC output port 105. The at least one additional resonant converter 160 may comprise a switching network 130 coupled to the DC input for generating a wave voltage, a resonant tank 135 positioned between and coupled to the switching network 130 and a bridge rectifier 140. The bridge rectifier 140 may be coupled to the DC output 105.

To balance the output currents of the system 300 having additional resonant converters 160, an additional current controlled voltage source 170 for each of the at least one additional resonant converters 160 may be coupled to each of two mutually adjacent resonant converters at a position between the switching networks 130 and the rectifier bridges 140 of each resonant converter such that neighbouring current controlled voltage sources are coupled for carrying current between them.

As discussed earlier, and referring to FIG. 1, the current controlled voltage source 150 may be coupled to the resonant converters 110, 120 at an AC side of each of the resonant converters 110, 120. In embodiments where a current balancing transformer 155 is used as the current controlled voltage source 150, having an alternating current being carried by first and second windings 156, 157 may reduce saturation in the current balancing transformer 155 as compared to having a direct current.

Referring again to FIG. 1, in some embodiments, the current controlled voltage source 150 may be positioned on the primary AC side, which is between the switching network 130 and the transformer 145 of each resonant converter 110, 120.

Figure 4:
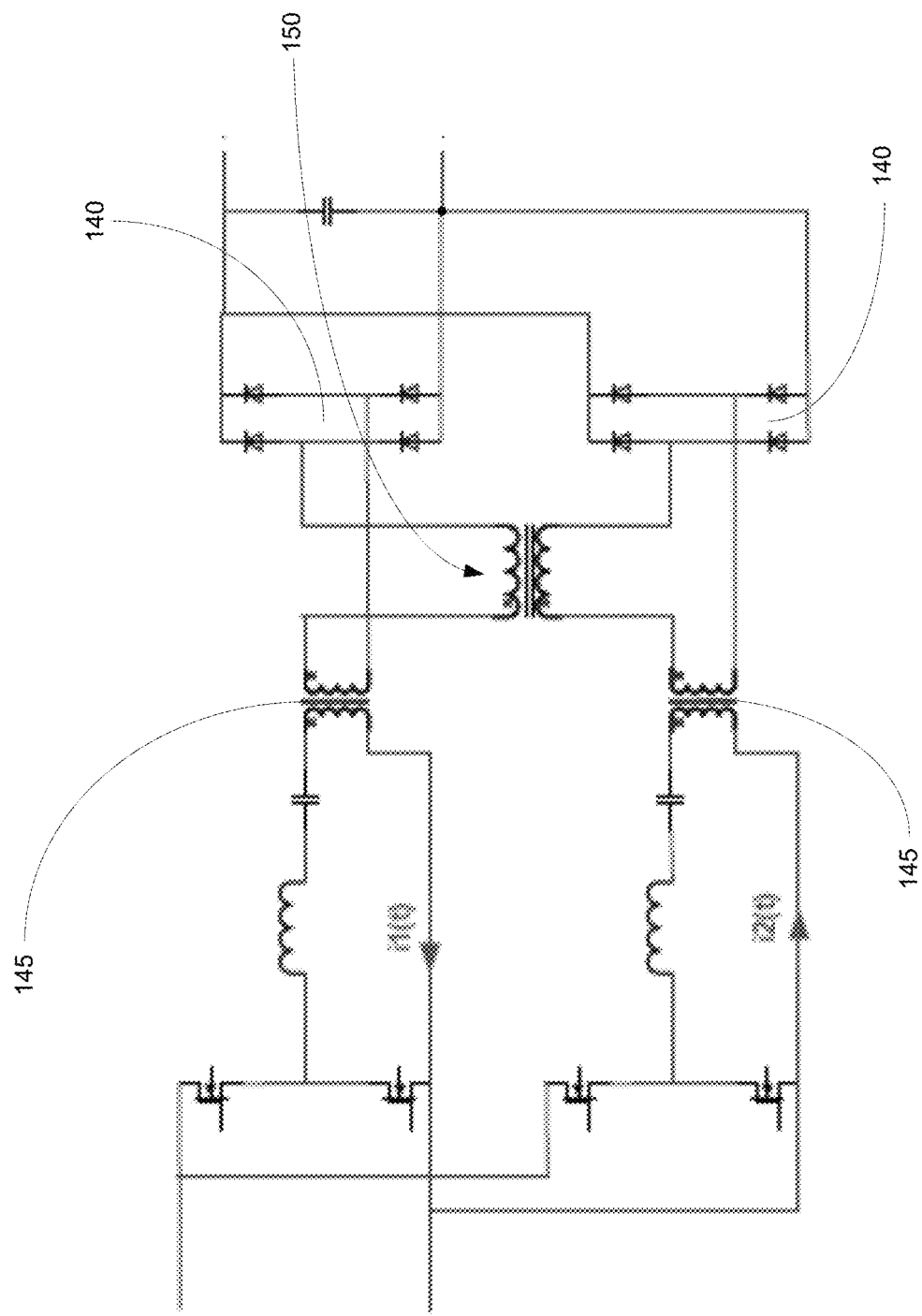
FIG. 4 is a circuit diagram showing a current controlled voltage source coupled to an AC secondary side of parallel connected resonant converters, according to another embodiment.

In certain embodiments, as shown in FIG. 4, the current controlled voltage source 150 may be positioned on the secondary AC side, which is between the bridge rectifier 140 and the transformer 145 of each resonant converter 110, 120.

A current balancing transformer may be used to balance output DC currents for any suitable configuration of parallel connected resonant converters. For example, in some embodiments, an LLC configuration may be used.

Furthermore, any suitable configuration of bridge rectifier may be used. In some embodiments, such as that shown in FIG. 4, the bridge rectifiers 140 may be full bridge rectifiers for providing a high DC output voltage. Bridge rectifiers may be useful in high output voltage applications because the maximum reverse voltage of the diodes is equal to the output voltage. However, the current goes through two diodes simultaneously, resulting in greater conduction losses, for each half period of the switching frequency.

Figure 5:
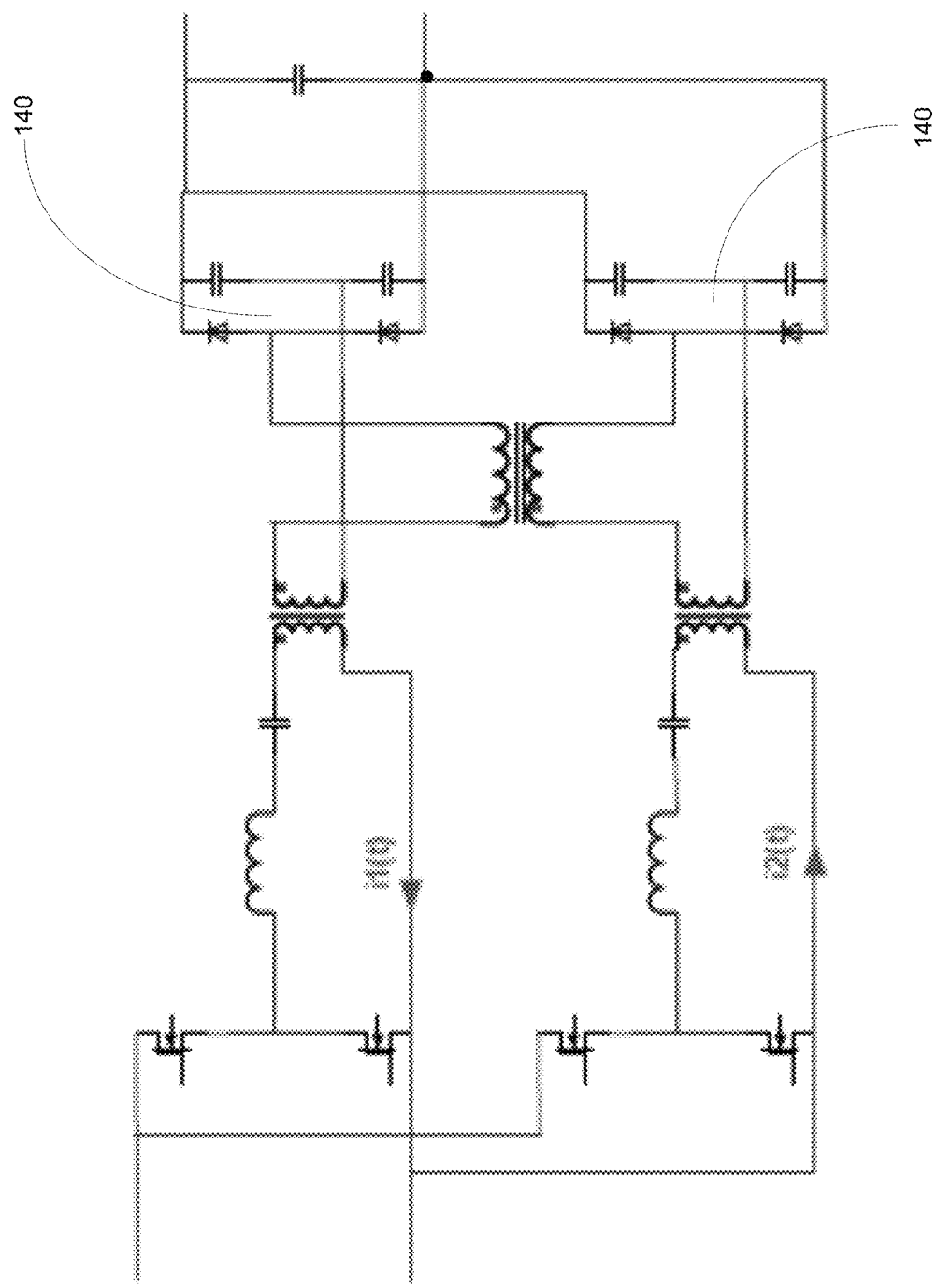
FIG. 5 is a circuit diagram of a system with half bridge rectifiers, according to one embodiment.

Referring to FIG. 5, in certain embodiments, the bridge rectifiers 140 may be half bridge rectifiers, which may be used for doubling the output DC voltage.

Figure 6:
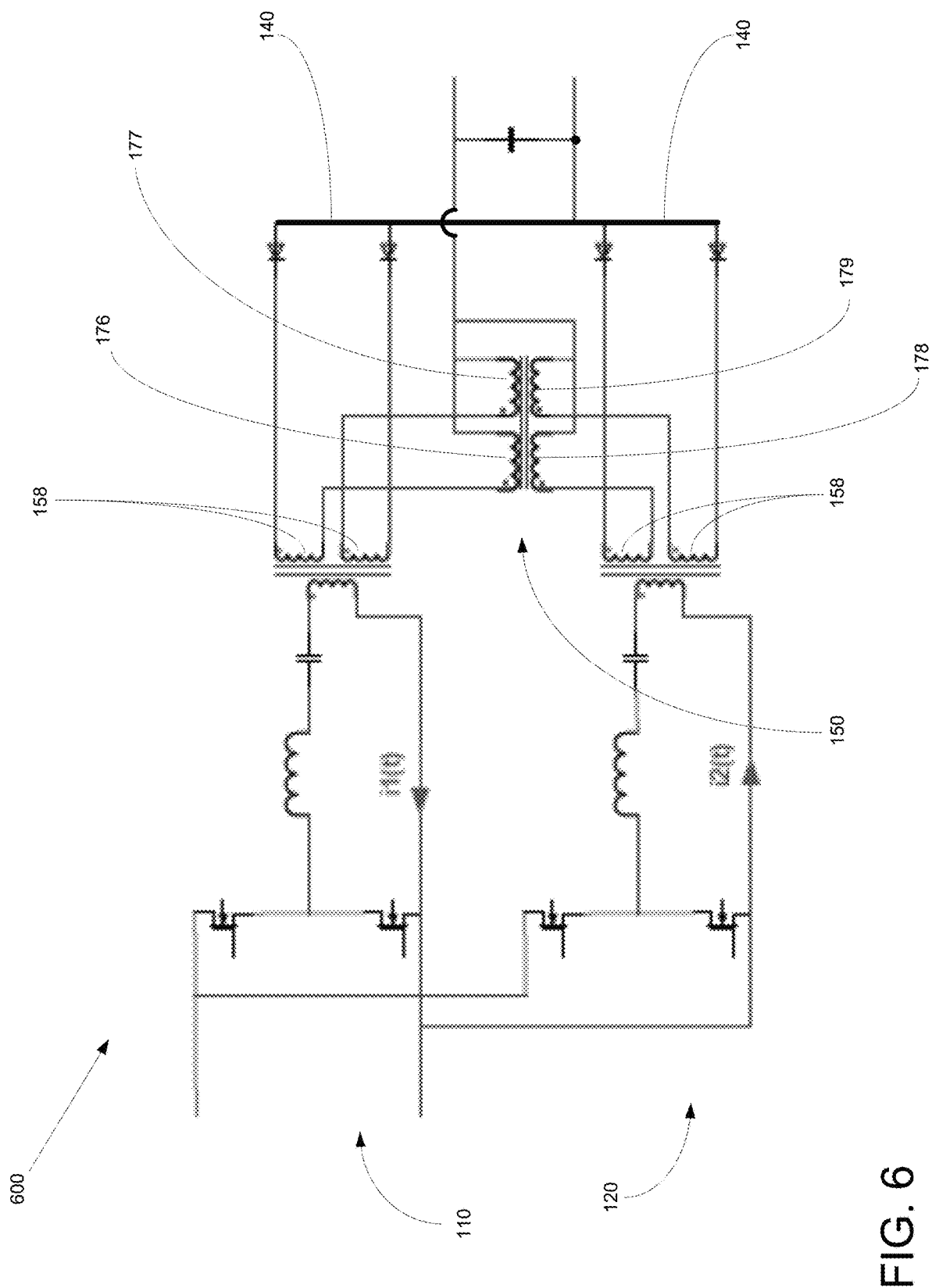
FIG. 6 is a circuit diagram of a system with centre tap rectifiers, according to one embodiment.

Referring to FIG. 6, in some embodiments, the bridge rectifiers 140 may be centre tap rectifiers. Centre tap rectifiers may be used in low voltage applications since the current may go through a single diode, but the reverse voltage across the diodes may be double the output voltage.

In some embodiments, a full wave rectifier may be used to match a centre tapped transformer.

In systems using centre tap rectifiers, the current balancing transformer 150 may have four windings instead of two windings. The system 600 may be configured, as with other embodiments, to induce voltages that oppose the direction of the current in the pair of windings with a larger current and support the direction of the current in the pair of windings with the smaller current.

In certain embodiments, as shown in FIG. 6, the first winding of the balancing transformer 150 comprises a pair of windings 176, 177 each coupled to a portion of the transformer secondary winding 158 of the first resonant converter 110 for carrying current between the pair of windings 176,177 and the first resonant converter transformer secondary winding 158. The second winding of the balancing transformer 150 comprises a pair of windings 178,179, each coupled to a portion of the transformer secondary winding 158 of the second resonant converter 120 for carrying current between each of the pair of windings 178, 179 of the second winding and the second resonant converter transformer secondary winding 158.

Figure 7:
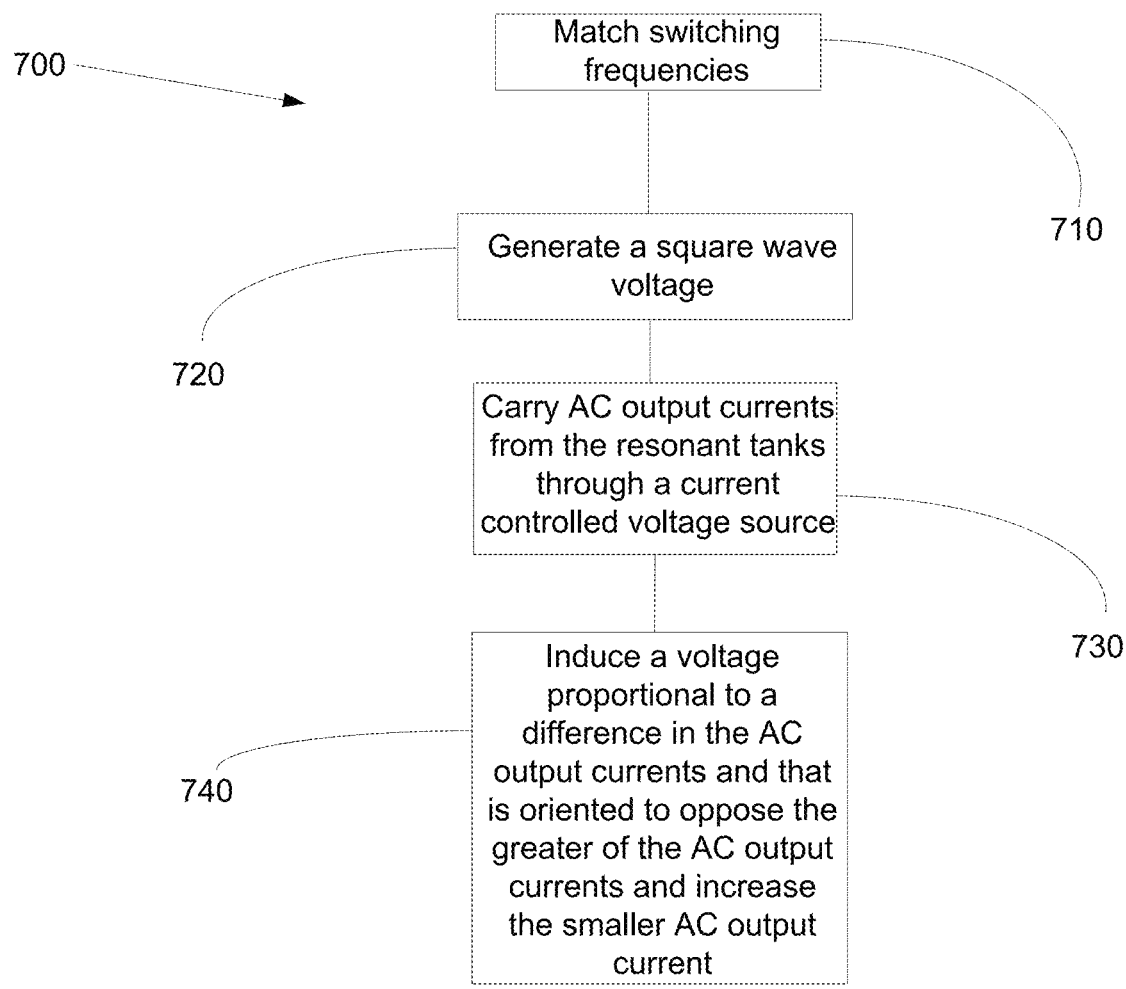
FIG. 7 shows a method for balancing output currents in a system of parallel connected resonant converters, according to one embodiment.

Referring to FIG. 7, a method for providing balanced current sharing between resonant converters connected in parallel to a DC output is shown at 700. At box 710, switching frequencies for a pair of resonant converters may be matched to each other. At box 720, a square wave voltage may be generated by switching networks.

At box 730, AC currents of resonant tanks of each of the resonant converters may be carried through a current controlled voltage source that is coupled to each of the resonant converters of the pair of resonant converters at an AC side of each of the resonant converters of the pair of resonant converters.

At box 740, a voltage that is proportional to the AC currents carried through the current controlled voltage source may be induced by the AC currents passing through the current controlled voltage source. The induced voltage may be oriented to oppose the greater of the AC currents and to increase the smaller of the AC currents.

Figure 8:
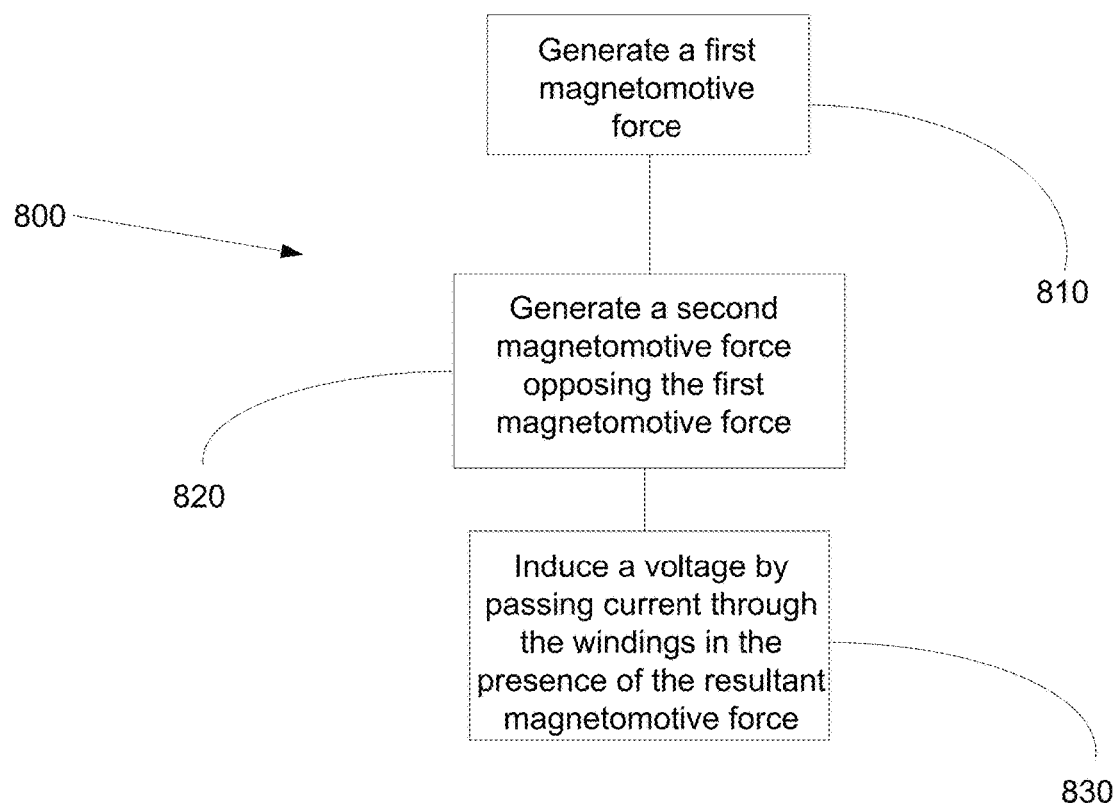
FIG. 8 shows a method for using a current balancing transformer for balancing output currents in a system of parallel connected resonant converters, according to one embodiment.

Referring to FIG. 8, a method for inducing a voltage using a current balancing transformer as the current controlled voltage source in accordance with some embodiments is shown at 800. At box 810, a first magnetomotive force may be generated by passing an AC current of a resonant tank of a first resonant converter of the pair of resonant converters through a first winding of the current balancing transformer.

At box 820, a second magnetomotive force opposing the first magnetomotive force may be generated by passing an AC current of a resonant tank of a second resonant converter of the pair of resonant converters through a second winding of the balancing transformer. The AC currents may flow through the first and second windings in mutually opposite directions.

At box 830, the voltage may be induced by current flow through the first and second windings in the presence of an aggregate magnetomotive force resulting from the difference between the first and second magnetomotive forces.

In some embodiments, the AC currents from the resonant tanks may be directed through the first and second windings in mutually opposite directions by introducing a 180-degree phase shift in switching sequences of the pair of resonant converters. In certain embodiments, the first winding and the second winding may be mutually reversely coupled to their respective resonant converters, causing the AC currents of the pair of resonant converters to flow through the first and second windings in mutually opposite directions.

The terminology used herein is for the purpose of describing particular embodiments only and is not intended to be limiting. Accordingly, as used herein, the singular forms "a", "an" and "the" are intended to include the plural forms as well, unless the context clearly indicates otherwise. It will be further understood that the terms "comprises" and "comprising," when used in this specification, specify the presence of one or more stated features, integers, steps, operations, elements, and components, but do not preclude the presence or addition of one or more other features, integers, steps, operations, elements, components, and groups.

It is contemplated that any part of any aspect or embodiment discussed in this specification can be implemented or combined with any part of any other aspect or embodiment discussed in this specification.

While particular embodiments have been described in the foregoing, it is to be understood that other embodiments are possible and are intended to be included herein. It will be clear to any person skilled in the art that modifications of and adjustments to the foregoing embodiments, not shown, are possible.

The invention claimed is:

1. A system for reducing a difference in AC currents of parallel connected resonant converters, the system comprising:
   (a) a DC output port for coupling to a load;
   (b) first and second resonant converters, each coupled to a DC input and both coupled in parallel to the DC output port, each of the resonant converters comprising a switching network coupled to the DC input for generating a wave voltage, a resonant tank positioned between and coupled to the switching network and a bridge rectifier, the bridge rectifier coupled to the DC output, wherein the resonant converters have matching switching frequencies;
   (c) a current controlled voltage source coupled to the first and the second resonant converter at a position between the switching networks and the rectifier bridges of each resonant converter, wherein the current controlled voltage source is for providing an induced voltage that is proportional in magnitude to a difference in a first AC current of the first resonant converter and a second AC current of the second resonant converter and is oriented to oppose a larger AC current of the first and second AC currents and in the same direction as a smaller AC current of the first and second AC currents, thereby decreasing a difference in the first and second AC currents;
   wherein the switching network is operable with a switching sequence for generating a 180-degree phase shift in switching sequences of the first and second resonant converters.

2. The system of claim 1 wherein the resonant converters are LLC resonant converters.

3. The system of claim 1 wherein the resonant converters are LCC resonant converters.

4. The system of claim 1 wherein the current controlled voltage source is a current balancing transformer comprising a first winding coupled in series to the first resonant converter for carrying the first AC current from the first resonant converter and a second winding coupled in series to the second resonant converter for carrying the second AC current from the second resonant converter, wherein the system is configured such that a first magnetomotive force generated by the first AC current flowing through the first winding is oriented opposite to a second magnetomotive force generated by the second AC current flowing through the second winding and the resultant aggregate magnetomotive force induces a voltage that opposes the greater of the first and second AC currents.

5. The system of claim 4 wherein the first winding and the second winding are mutually reversely coupled to their respective resonant converters for having mutually opposite current flow through the first and second windings and generating magnetomotive forces that are oriented in mutually opposite directions.

6. The system of claim 1 wherein the resonant tank and rectifier bridge of each resonant converter are coupled by a transformer having a primary winding coupled to the resonant tank for carrying current from the resonant tank and having a secondary winding coupled to the bridge rectifier for carrying current to the bridge rectifier.

7. The system of claim 6 wherein the current controlled voltage source is positioned between the resonant tank and the transformer of each resonant converter.

8. The system of claim 6 wherein the current controlled voltage source is positioned between the switching network and the resonant tank of each resonant converter.

9. The system of claim 6 wherein the current controlled voltage source is positioned between the bridge rectifier and the transformer of each resonant converter.

10. The system of claim 1 wherein the bridge rectifiers are full bridge rectifiers.

11. The system of claim 1 wherein the bridge rectifiers are half bridge rectifiers.

12. The system of claim 4 wherein the bridge rectifiers are center tap rectifiers.

13. The system of claim 12 wherein the first winding of the balancing transformer comprises a pair of windings each coupled to a portion of the transformer secondary winding of the first resonant converter for carrying current between the pair of windings and the first resonant converter transformer secondary winding and wherein the second winding of the balancing transformer comprises a pair of windings, each coupled to a portion of the transformer secondary winding of the second resonant converter for carrying current between each of the pair of windings of the second winding and the second resonant converter transformer secondary winding.

14. The system of claim 1 wherein the wave voltage is a square wave voltage.

15. The system of claim 1 further comprising:
(a) at least one additional resonant converter coupled to a DC input and connected in parallel with the first and second resonant converters to the DC output port, the at least one additional resonant converter comprising a switching network coupled to the DC input for generating a wave voltage, a resonant tank positioned between and coupled to the switching network and a bridge rectifier, the bridge rectifier coupled to the DC output;
(b) an additional current controlled voltage source for each of the at least one additional resonant converters, with each additional current controlled voltage source coupled to each of two mutually adjacent resonant converters at a position between the switching networks and the rectifier bridges of each resonant converter such that neighbouring current controlled voltage sources are coupled for carrying current between them.

16. The system of claim 15 wherein the DC input is common for each of the resonant converters.

17. The system of claim 15 wherein the DC input is individual for each of the resonant converters.

18. A resonant converter comprising;
(a) two or more resonant converters connected in parallel to a DC output, each resonant converter comprising a switching network coupleable to a DC power source for generating a wave voltage, a resonant tank positioned between and coupled to the switching network and a bridge rectifier;
(b) one or more current controlled voltage sources, with the total number of current controlled voltage sources being at least one less than the total number of resonant converters, with each one of the controlled voltage sources coupled to each of two mutually adjacent resonant converters at a position between the switching networks and the rectifier bridges of each resonant converter such that neighbouring current controlled voltage sources are coupled for carrying current between them and wherein the switching network for each of the two mutually adjacent resonant converters is operable with a switching sequence for generating a 180-degree phase shift in switching sequences of the two mutually adjacent resonant converters;
wherein each of the current controlled voltage sources is for providing an induced voltage that is proportional in magnitude to a difference in AC currents of the resonant tanks that the current controlled voltage source is coupled to and that is oriented to oppose a larger of the AC currents and in the same direction as a smaller of the AC currents, thereby decreasing a difference in output currents of the resonant converters.

19. A method for balanced current sharing between resonant converters connected in parallel to a DC output, the method comprising:
(a) matching switching frequencies for a pair of resonant converters;
(b) carrying a first AC current of a first resonant tank of a first resonant converter of the pair of resonant converters and a second AC current of a second resonant tank of a second resonant converter of the pair of resonant converters through a current controlled voltage source that is coupled to each of the first and second resonant converters at an AC side of each of the first and second resonant converters, wherein the current controlled voltage source comprises a current balancing transformer; and
(c) inducing for the pair of resonant converters a voltage that is proportional to a difference in the first and second AC currents carried through the current controlled voltage source by passing the first and second AC currents through the current controlled voltage source and where inducing the voltage comprises:

(i) generating a first magnetomotive force by passing the first AC current through a first winding of the balancing transformer;

(ii) generating a second magnetomotive force opposing the first magnetomotive force by passing the second AC current through a second winding of the balancing transformer, wherein the first and second AC currents flow through the first and second windings in mutually opposite directions; and (iii) inducing the voltage by having the first and second AC currents flow through the first and second windings respectively in the presence of an aggregate magnetomotive force resulting from the difference between the first and second magnetomotive forces;

wherein the induced voltage is oriented to oppose the greater of the first and second AC currents and to increase the smaller of the first and second AC currents.

20. The method of claim 19 further comprising introducing a 180-degree phase shift in switching sequences of the pair of resonant converters to have the first and second AC currents flow through the first and second windings respectively in mutually opposite directions.

21. The method of claim 19 wherein the first winding and the second winding are mutually reversely coupled to their respective resonant converters.

22. The method of claim 19 wherein the resonant converters are LLC resonant converters.

23. The method of claim 19 wherein the resonant converters are LCC resonant converters.

24. The method of claim 19 further comprising generating a square wave voltage for operation of the resonant converters by using switching networks.

25. The method of claim 19 wherein the current controlled voltage source is coupled to the resonant converters at a primary AC side of each of the resonant converters.

26. The method of claim 19 wherein the current controlled voltage source is coupled to the resonant converters at a secondary AC side of each of the resonant converters.

* * * * *